(12) United States Patent
Morden et al.

(10) Patent No.: US 7,377,891 B2
(45) Date of Patent: May 27, 2008

(54) CARTON BOTTOM SEALER APPARATUS AND METHOD

(75) Inventors: George Allen Morden, Coralville, IA (US); Cletus Emerich Kreher, Marion, IA (US)

(73) Assignee: Evergreen Packaging Inc., Memphis, TN (US)

( * ) Notice: Subject to any disclaimer, the term of this patent is extended or adjusted under 35 U.S.C. 154(b) by 0 days.

(21) Appl. No.: 11/302,760

(22) Filed: Dec. 14, 2005

(65) Prior Publication Data

US 2007/0135284 A1 Jun. 14, 2007

(51) Int. Cl.
*B31B 1/90* (2006.01)
*F16K 31/44* (2006.01)

(52) U.S. Cl. .................................. 493/102; 493/174

(58) Field of Classification Search ............... 493/102, 493/162, 164, 166, 167, 174, 3, 84; 251/251, 251/263; 156/443, 493, 475, 580, 581
See application file for complete search history.

(56) References Cited

U.S. PATENT DOCUMENTS

| | | | |
|---|---|---|---|
| 3,692,611 A | | 9/1972 | Kuhnle |
| 4,799,611 A | * | 1/1989 | Taga .......................... 227/18 |
| 5,180,355 A | * | 1/1993 | Inoue .......................... 493/315 |
| 5,454,253 A | * | 10/1995 | Mueller ........................ 72/349 |
| 5,544,576 A | | 8/1996 | Kato |
| 6,073,503 A | | 6/2000 | Matsuno et al. |
| 6,669,614 B2 | * | 12/2003 | Morden et al. ............. 493/102 |
| 2002/0053133 A1 | * | 5/2002 | Suhara et al. ................ 29/700 |
| 2002/0170269 A1 | | 11/2002 | Liao |

FOREIGN PATENT DOCUMENTS

| | | |
|---|---|---|
| CH | 306 808 A | 4/1955 |
| DE | 44 37 958 A1 | 4/1995 |

* cited by examiner

*Primary Examiner*—Rinaldi I. Rada
*Assistant Examiner*—John Paradiso
(74) *Attorney, Agent, or Firm*—Daniel F. Nesbitt; Donald E. Hasse; Hasse & Nesbitt LLC

(57) ABSTRACT

An apparatus for effecting closure of an open end of a carton blank by placing portions of the carton blank into overlying relationship to one another is provided. The apparatus includes a cam that rotates about an axis of rotation and a cam lever that is operatively connected to the cam. The cam lever is used to convert rotating motion of the cam into linear motion to define a first stroke distance. A pressure pad is mounted for movement toward and away from the portions of the carton blank. The pressure pad is capable of being moved in response to input provided by the cam to define a second stroke distance. An air spring is mechanically linked to the cam lever and the pressure pad such that the air spring absorbs a portion of the first stroke distance.

22 Claims, 6 Drawing Sheets

CARTON BOTTOM SEALER APPARATUS AND METHOD

TECHNICAL FIELD

The present application relates generally to carton filling apparatus and more particularly to a carton bottom sealer apparatus and associated method.

BACKGROUND

Conventional paperboard cartons for liquid food products are commonly constructed from paperboard sheets coated with a film of a heat sealable, waterproof thermoplastic material such as polyethylene, polyvinyl chloride or polypropylene. When heated, this plastic film becomes tacky, so that sheets thus coated and heated can be sealed together by being squeezed tightly together. The coated sheets are initially cut into flat carton blanks. These blanks are subsequently folded into a generally rectangular open-ended configuration, then are closed at one end by forming a bottom end wall via folding and sealing bottom end closure panels which extend integrally from the four side walls of the carton blank. The cartons can then be filled and sealed with a gabled or flat-folded top.

Automated carton filling apparatus are frequently used to automatically form, fill and seal cartons. Automated mechanical systems (e.g., a top sealer and a bottom sealer) are frequently utilized to fold and/or seal the tops and/or bottoms of the cartons. Due to the rates of speed of production, such systems can be noisy. Mechanically driven systems have been proposed to reduce noise during operation.

SUMMARY

In an aspect, an apparatus for effecting closure of an open end of a carton blank by placing portions of the carton blank into overlying relationship to one another is provided. The apparatus includes a cam that rotates about an axis of rotation and a cam lever that is operatively connected to the cam. The cam lever is used to convert rotating motion of the cam into linear motion to define a first stroke distance. A pressure pad is mounted for movement toward and away from the portions of the carton blank. The pressure pad is capable of being moved in response to input provided by the cam to define a second stroke distance. An air spring is mechanically linked to the cam lever and the pressure pad such that the air spring absorbs a portion of the first stroke distance.

In another aspect, an apparatus for effecting closure of an open end of a carton blank by placing portions of the carton blank into overlying relationship to one another is provided. The apparatus includes a cam that rotates about an axis of rotation and a cam lever that is operatively connected to the cam. The cam lever is used to convert rotating motion of the cam into linear motion. A pressure pad is mounted for movement toward and away from the portions of the carton blank. The pressure pad is capable of being moved in response to input provided by the cam for a carton sealing operation. An air cylinder is mechanically linked to the cam lever, wherein actuation of the air cylinder decouples the pressure pad and the cam such that the pressure pad remains in a retracted position irrespective of movement of the cam.

In another aspect, a method for effecting closure of an open end of a carton blank by placing portions of the carton blank into overlying relationship to one another using a bottom sealing apparatus is provided. The method includes mechanically linking a cam and a pressure pad using a cam lever and an air spring. The cam lever converts rotating motion of the cam into linear motion defining a first stroke distance. The pressure pad is capable of being moved in response to input provided by the cam defining a second stroke distance. A portion of the first stroke distance is absorbed using the air spring.

The details of one or more embodiments of the invention are set forth in the accompanying drawings and the description below. Other features, objects, and advantages of the invention will be apparent from the description and the drawings, and from the claims.

DETAILED DESCRIPTION

Figure 1:
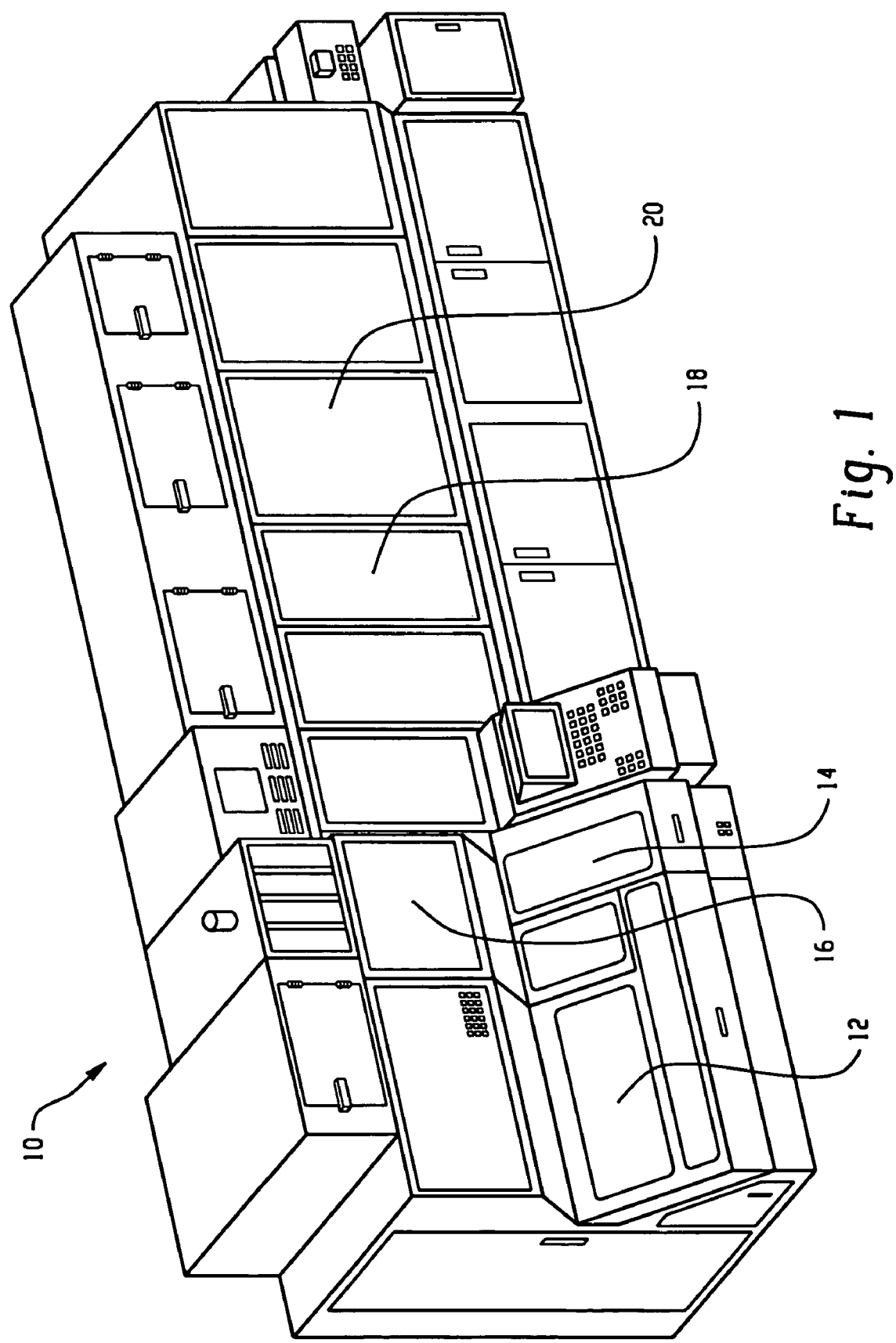
FIG. 1 is a perspective view of an embodiment of a carton filling apparatus.

Referring to FIG. 1, a container filling apparatus 10 sometimes referred to as a form, fill and seal packaging machine includes a carton magazine 12 for storing flat carton blanks, a carton preassembly station 14 and a bottom forming and sealing station 16. The apparatus 10 may also include air filtering features for filtering contaminants such as dust particles from regions of the apparatus through which the cartons travel. The apparatus 10 further includes a filling station 18 that is used to fill cartons subsequent to their preassembly at station 14 and bottom forming and sealing at station 16. Top panels of the cartons are folded and sealed at a top sealing station 20.

Figure 2:
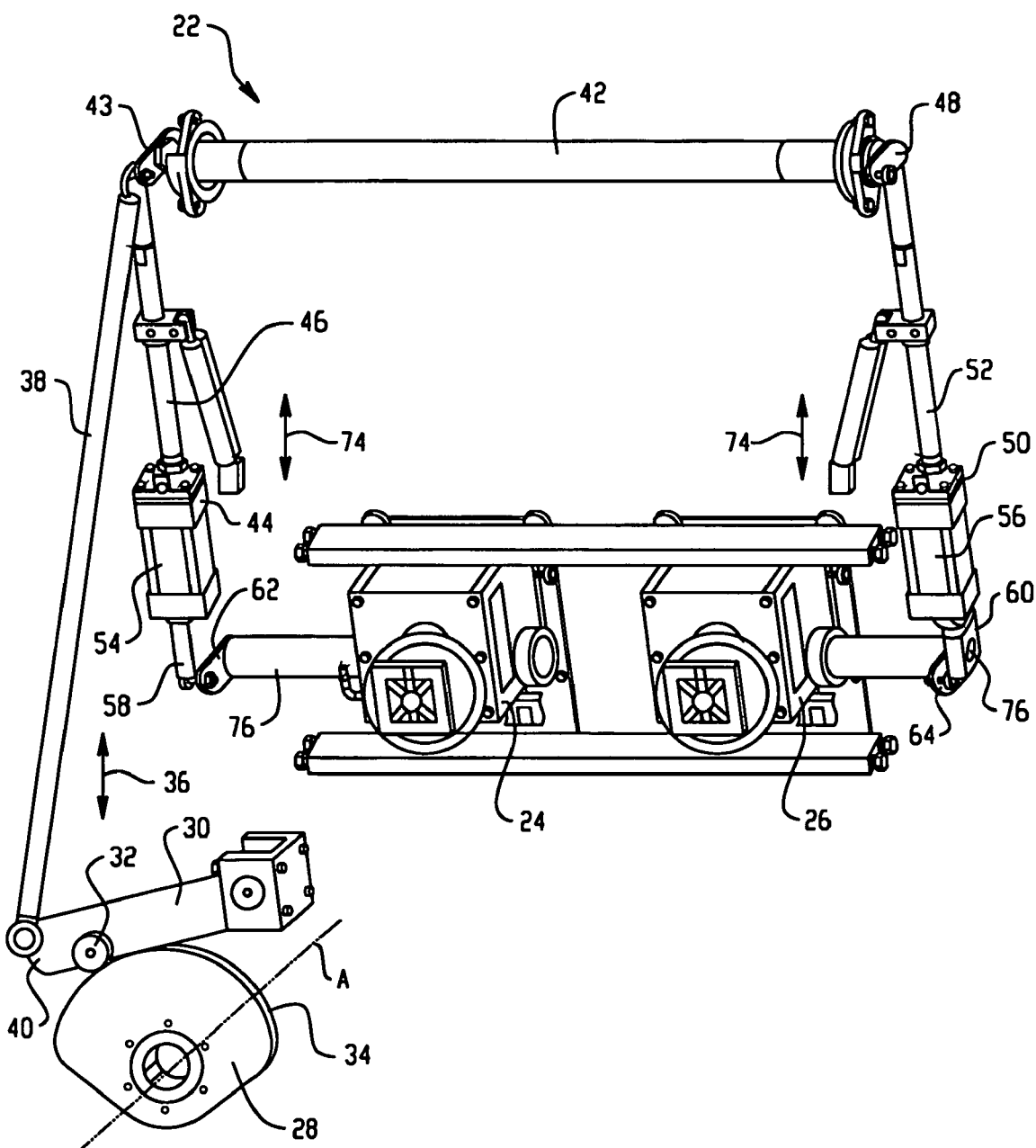
FIG. 2 is a perspective view of selected components of an embodiment of a bottom sealer apparatus of use in the carton filling apparatus of FIG. 1.

Referring to FIG. 2, a perspective view of certain components of a bottom sealer apparatus 22 for use at station 16 are shown. Bottom sealer apparatus 22 includes a first bottom sealer mechanism 24 for use in sealing cartons traveling along a first carton sealing line and a second bottom sealer mechanism 26 for sealing cartons traveling along a second carton sealing line. In alternative embodiments, only one or more than two bottom sealer mechanisms 24, 26 may be utilized.

In the illustrated embodiment, both sealer mechanisms 24 and 26 are driven by a rotating cam 28 (e.g., an open-face cam, a closed-face cam or a combination thereof) and a cam lever 30 including a roller 32 that rides along a cam surface 34 as the cam rotates. With cam 28 rotation about axis A, the cam lever 30 moves vertically in the direction of arrow 36 to define a cam stroke distance. Cam surface 34 can be formed using a computer generated profile for controlling acceleration and deceleration of the sealer mechanisms 24, 26, which can provide smooth motion, e.g., without any abrupt starts or stops.

A push rod 38 connects an end 40 of the cam lever 30 to a first arm member 43, which is rigidly coupled to both a secondary shaft 42 and an air cylinder frame 44 by a connecting rod 46. Secondary shaft 42 transfers force generated due to rotational motion of the first arm member 43 to a second arm member 48 rigidly connected to the secondary shaft to rotate the second arm member in a similar or identical fashion to the first arm member. In some embodiments, the first and second arm members 43 and 48 rotate in an arc from an initial position through between about 10 and 90 degrees (e.g., from an initial position through about 30 and 45 degrees) due to the movement of the push rod 38. The second arm member 48 is rigidly coupled to an air cylinder frame 50 that is disposed at a side of the bottom sealer apparatus 22 that is opposite that which the air cylinder frame 44 is located by a connecting rod 52.

Figure 3:
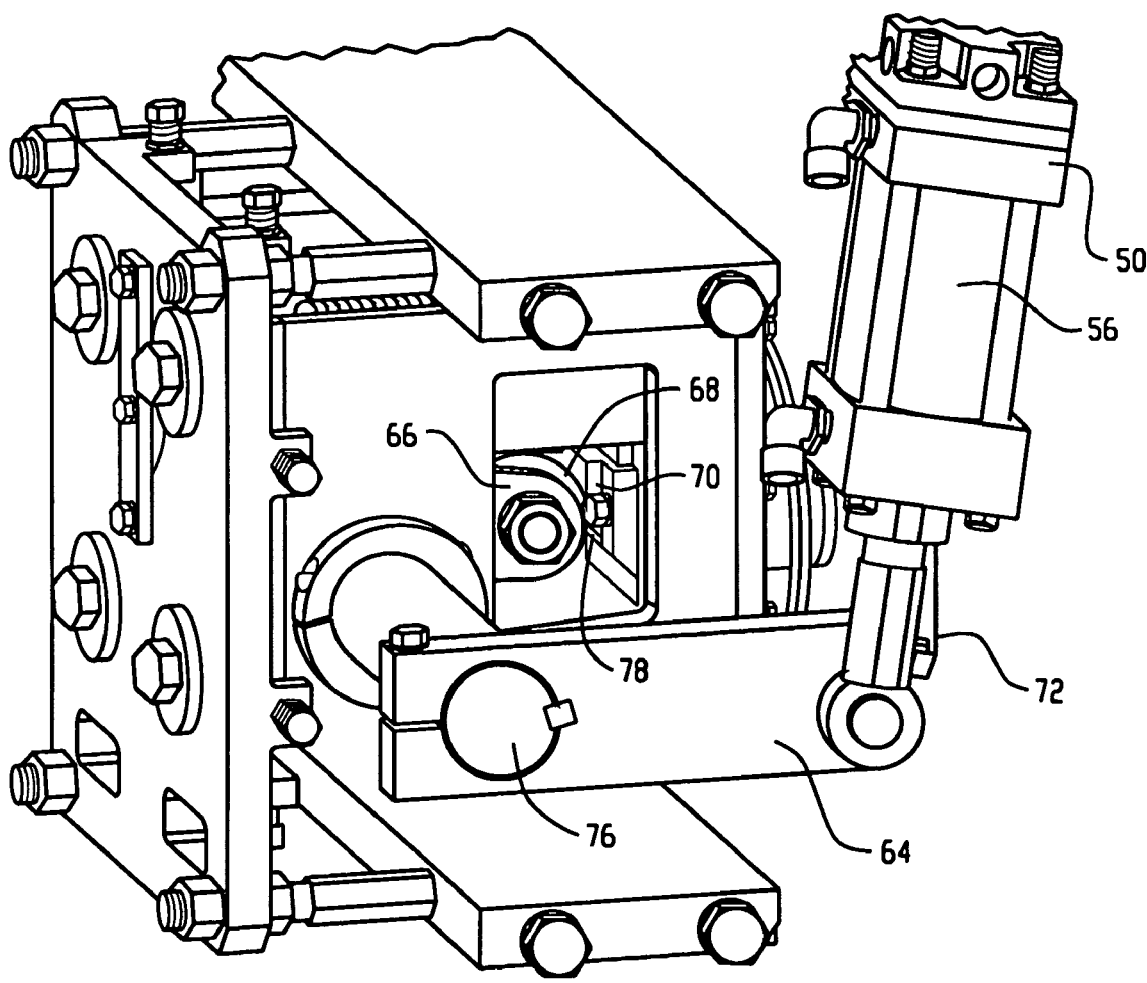
FIG. 3 is a detail view of the bottom sealer apparatus of FIG. 2.
Figure 4:
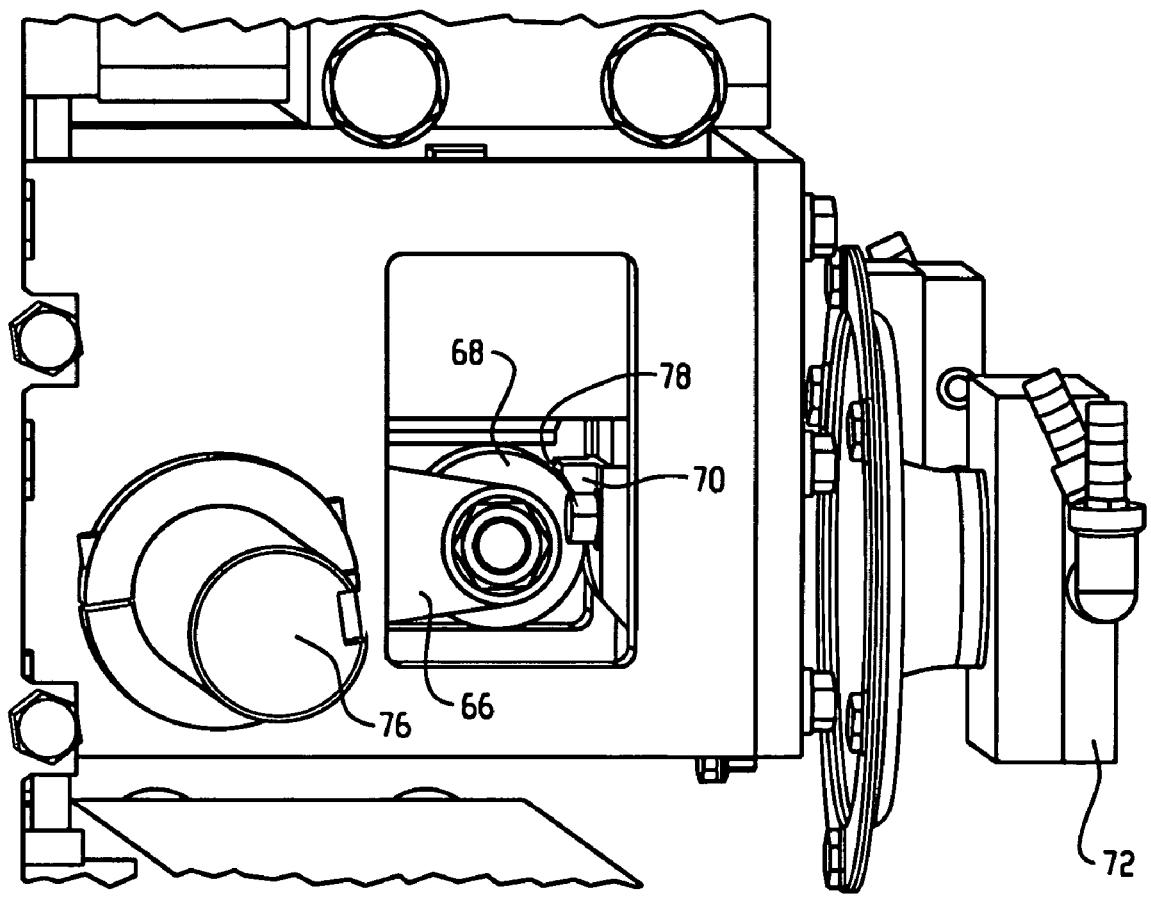
FIG. 4 is another detail view of the bottom sealer apparatus of FIG. 2 with components removed.

An air cylinder 54, 56 is fixedly coupled to each cylinder frame 44, 50. Each air cylinder 54, 56 includes a respective cylinder rod 58, 60 that is connected to a respective actuator lever 62, 64. As can be appreciated, as the first and second arm members 43 and 48 move in their arcs due to their linkages to the cam 28, the air cylinders 54, 56 move in the direction of arrow 74 due to the cylinders' linkages to the frames 44, 50. The actuator levers 62, 64 pivot about a respective axis 76 due to the motion of the air cylinders 54, 56 and the linkage between the cylinder rod 58, 60 and the actuator lever. Referring now to FIG. 3, the actuator levers 62, 64 are each fixedly coupled to a roller arm (only roller arm 66 and actuator lever 62 are depicted) that carries a roller 68. The roller arm 66 also pivots about axis 76 due to its linkage with the actuator lever 64. The roller 68 rides along a surface 78 of a cam block 70 to extend and retract a sealing pad 72 to define a pad stroke distance for a sealing operation. In some embodiments, the sealing pad 72 is biased toward the retracted position (e.g., by a spring). Referring also to FIG. 4, as the roller 68 rotates upward, the roller causes the cam block 70 to extend the sealing pad 72 due to the shape of the surface 78. The cam block 70 can be shaped to maintain a uniform force multiplication ratio as pressure is applied to a carton bottom with the sealing pad 72.

Figure 5:
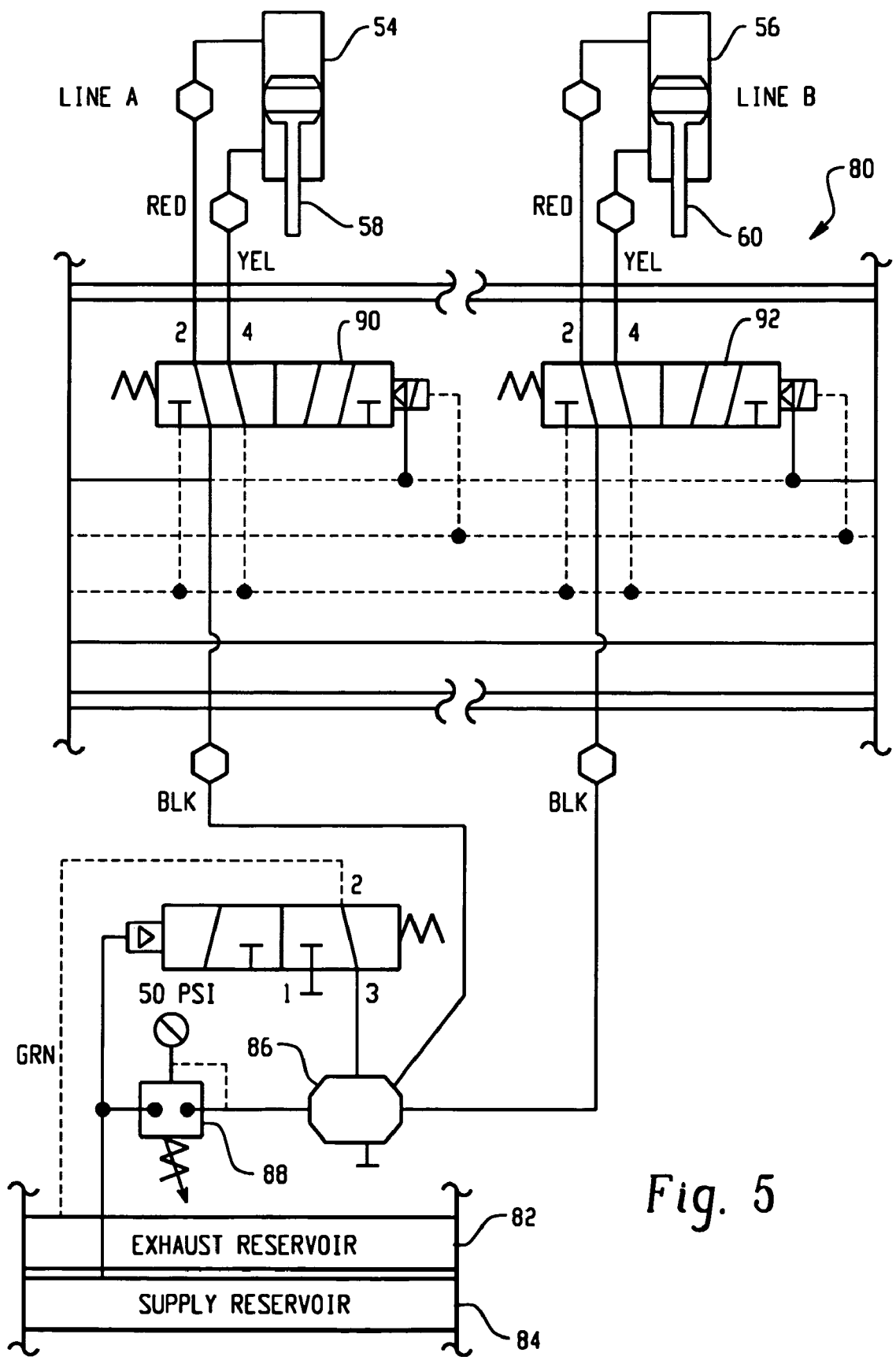
FIG. 5 schematically illustrates an embodiment of a control system for use in controlling the bottom sealer apparatus of FIG. 2.

Referring to FIG. 5, air cylinders 54 and 56 are controlled through use of control circuit 80. Control circuit 80 includes an exhaust reservoir 82, a supply reservoir 84 and a surge tank 86. Surge tank 86 serves as a reservoir for sending compressed air to and from the air cylinders 54, 56. An air pressure regulator 88 controls the pressure in the surge tank 86 and control circuit 80. The pressure can be increased in the surge tank 86 to increase the force applied to the carton or lowered to decrease the force applied to the carton. Control circuit 80 further includes control valves 90 and 92 (shown in their de-energized positions). The control valves 90 and 92 are used to extend and retract the cylinder rods 58 and 60.

With the control valves 90 and 92 de-energized as shown by FIG. 5, pressurized air is delivered from the pressure regulated surge tank 86 to the air cylinders 54, which causes the cylinder rods 58 and 60 to extend. By extending the cylinder rods 58 and 60, the roller 68 disengages the cam block 70 so that the sealing pads 72 remain in their retracted positions, even in instances where the cam 28 continues to rotate (see FIGS. 3 and 4). Disengaging the roller 68 from the cam block 70 (e.g., when there are no cartons being sealed) can eliminate unnecessary sealing pad 72 motion, which can reduce wear and extend the life of bottom sealer components. A controller (not shown) may be used to automatically control actuation of the control valves 90, 92).

Figure 6:
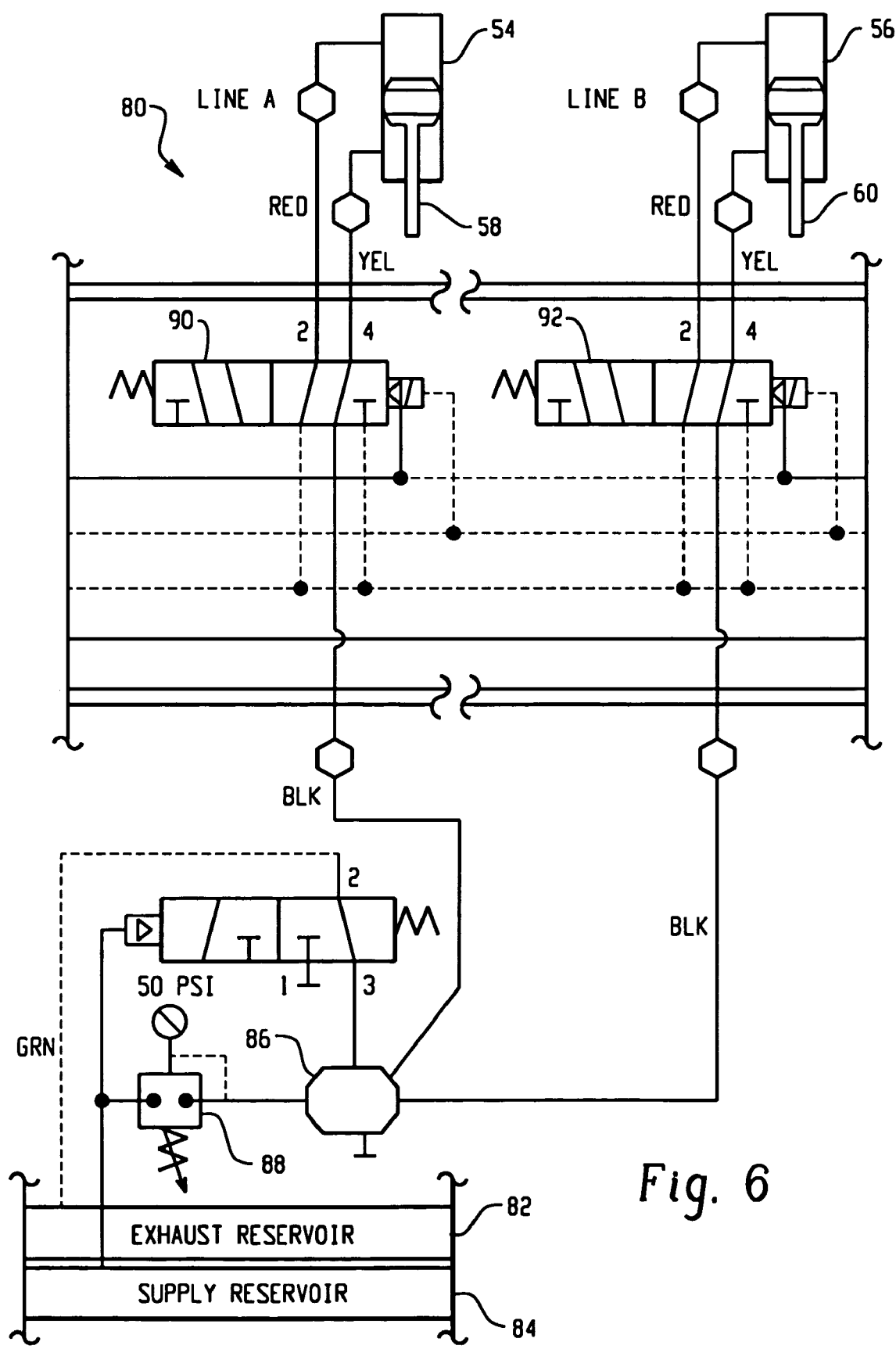
FIG. 6 schematically illustrates the control system of FIG. 5 with energized control valves.

Referring now to FIG. 6, the control valves 90 and 92 can be actuated (e.g., when cartons are present for a sealing operation) to send compressed air from the pressure regulated surge tank 86 to retract the cylinder rods 58 and 60. Referring also to FIGS. 3 and 4, by retracting the cylinder rods 58, 60, the roller 68 can engage the cam block 70 so that the roller 68 rides along the surface 78 of the cam block 70 to extend and retract the sealing pad 72 (e.g., a stroke distance of about 0.5 inch) in response to rotation of the cam 28 as described above.

The air cylinders 54 and 56 are used to transmit cam 28 motion to the sealer mechanisms 24 and 26 to operate the sealer pads 72. Most of the stroke distance of the sealing pad 72 is used to move the sealer pad into a preliminary sealing position. A final portion of the pad stroke distance is used to compress a carton bottom to create a bottom carton seal. The length of this final portion of pad stroke distance is dependent on, for example, carton board thickness and any free-play in the linkage connections described above between the cam 28 and the sealing pad 72. Thus, it is desirable for the cam 28 to provide some greater amount of stroke distance than is actually required to effectuate a seal using the sealing pad 72. To reduce the probability of damage due to the stroke distance provided by the cam 28, this greater amount of stroke is absorbed by the air cylinders 54 and 56, when the air cylinders are in their retracted positions, through forced extension of the air cylinder rods 58 and 60 when the sealing pad reaches its maximum pad stroke distance. As such, the air cylinders 54, 56 each operate as an air spring that absorbs a portion of the stoke distance provided by the cam 28. As used herein, an air spring refers to a spring operated using air or other compressible fluid under pressure. While air cylinders 54, 56 are shown and described, other suitable components may be used to form air springs, such as air bladders, air bellows, etc.

In some embodiments, as the air cylinders rods 58 and 60 are forced to extend, absorbing the final amount of cam stroke distance, the air cylinders maintain substantially a constant spring force. This constant spring force is due air being allowed to flow from the air cylinders 54 and 56 back to the surge tank 86, which has a much larger volume (e.g., ten times the volume or more) than the volume change in the air cylinders. During a normal sealing operation, air can be allowed to flow back to and from the surge tank 86 so that little or no compressed air is consumed.

By providing control system 80, relatively quiet machine 10 operation can be realized. In some embodiments, the carton filling apparatus 10 may operate at a noise level of less than about 80 dB, such as at about 78 dB. Noise level can be measured using a M-27 Noise Logging Dosimeter, available from Quest Technologies Inc., that is spaced horizontally from the apparatus 10 one meter and is placed one meter off of the ground with the apparatus 10 at its operating location.

A number of detailed embodiments have been described. Nevertheless, it will be understood that various modifications may be made. Accordingly, other embodiments are within the scope of the following claims.

What is claimed is:

1. A method for effecting closure of an open end of a carton blank by placing pressure-sealable bottom end closure panels of the carton blank into overlying relationship to one another and pressure sealing the overlying bottom end closure panels using a bottom sealing apparatus, the method comprising:

mechanically linking a cam and a pressure pad using there between a cam lever and an air spring, the cam lever converting rotating motion of the cam into linear motion defining a first stroke distance, the pressure pad capable of being moved in response to input provided by the cam defining a second stroke distance; and absorbing a portion of the first stroke distance using the air spring.

2. The method of claim 1, wherein the air spring comprises an air cylinder.

3. The method of claim 2 further comprising forcibly extending a cylinder rod of the air cylinder to absorb the portion of the first stroke distance with the air cylinder in a retracted configuration.

4. The method of claim 2 further comprising actuating the air cylinder and decoupling the cam and the pressure pad such that the pressure pad remains in a retracted position irrespective of rotation of the cam.

5. The method of claim 4 wherein the step of actuating the air cylinder includes extending the air cylinder by providing communication between the air cylinder and a pressurized air source.

6. The method of claim 5 further comprising regulating the air pressure of the pressurized air source using a pressure regulator.

7. The method of claim 1 further comprising sealing an open end of a carton blank by applying pressure to overlying portions of the carton blank using the pressure pad with the pressure pad in an extended position.

8. An apparatus for effecting closure of an open end of a carton blank by placing pressure-sealable bottom end closure panels of the carton blank into overlying relationship to one another and pressure sealing the bottom end closure panels, the apparatus comprising:
 a cam that rotates about an axis of rotation;
 a cam lever operatively connected to the cam, the cam lever used to convert rotating motion of the cam into linear motion to define a first stroke distance;
 a pressure pad mounted for movement toward and away from the bottom end closure panels to apply and release pressure on the overlying bottom end closure panels of the carton blank, the pressure pad capable of being moved in response to input provided by the cam to define a second stroke distance; and
 an air spring mechanically linked between the cam lever and the pressure pad such that the air spring absorbs a portion of the first stroke distance.

9. The apparatus of claim 8, wherein the air spring comprises an air cylinder.

10. The apparatus of claim 9 further comprising a control system for extending and retracting the air cylinder, the air cylinder being linked to the pressure pad such that the pressure pad moves in response to input provided by the cam lever with the air cylinder in one of a retracted or extended configuration and the pressure pad remains in a retracted position irrespective of movement of the cam with the cylinder in the other of the retracted or extended configuration.

11. The apparatus of claim 10 further comprising a surge tank capable of communicating with the air cylinder.

12. The apparatus of claim 11 further comprising a control valve for selectively allowing communication between the surge tank and the air cylinder.

13. The apparatus of claim 12 further comprising a pressure regulator for regulating pressure in the surge tank.

14. The apparatus of claim 10, wherein the air cylinder absorbs the portion of the first stroke distance through forced extension of a cylinder rod of the air cylinder with the air cylinder in the retracted configuration.

15. The apparatus of claim 8, wherein the cam is an open-face or closed-face cam, the cam lever including a roller that rides a surface of the cam.

16. An apparatus for effecting closure of an open end of a carton blank by placing pressure-sealable bottom end closure panels of the carton blank into overlying relationship to one another and pressure sealing the overlying bottom end closure panels, the apparatus comprising:
 a cam that rotates about an axis of rotation;
 a cam lever operatively connected to the cam, the cam lever used to convert rotating motion of the cam into linear motion;
 a pressure pad mounted for movement toward and away from the bottom end closure panels to apply and release pressure on the overlying bottom end closure panels of the carton blank, the pressure pad capable of being moved in response to input provided by the cam for a carton sealing operation; and
 an air cylinder mechanically linked between the cam lever and the pressure pad,
 wherein actuation of the air cylinder decouples the pressure pad and the cam such that the pressure pad remains in a retracted position irrespective of movement of the cam.

17. The apparatus of claim 16, wherein the air cylinder decouples the pressure pad and the cam with the air cylinder in an extended configuration.

18. The apparatus of claim 17, wherein the air cylinder couples the pressure pad and the cam with the air cylinder in a retracted configuration such that the pressure pad is moved in response to input provided by the cam.

19. The apparatus of claim 16, wherein the cam is an open-face or closed-face cam, the cam lever including a roller that rides a surface of the cam.

20. The apparatus of claim 16 further comprising a surge tank capable of communicating with the air cylinder.

21. The apparatus of claim 20 further comprising a control valve for selectively allowing communication between the surge tank and the air cylinder.

22. The apparatus of claim 21 further comprising a pressure regulator for regulating pressure in the surge tank.

* * * * *